United States Patent
Johnson

(10) Patent No.: US 11,243,743 B2
(45) Date of Patent: Feb. 8, 2022

(54) OPTIMIZATION OF NEURAL NETWORKS USING HARDWARE CALCULATION EFFICIENCY AND ADJUSTMENT FACTORS

(71) Applicant: Facebook, Inc., Menlo Park, CA (US)

(72) Inventor: Jeffrey Hoyle Johnson, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 253 days.

(21) Appl. No.: 16/528,982

(22) Filed: Aug. 1, 2019

(65) Prior Publication Data

US 2020/0125330 A1    Apr. 23, 2020

Related U.S. Application Data

(60) Provisional application No. 62/747,583, filed on Oct. 18, 2018.

(51) Int. Cl.
| | | |
|---|---|---|
| *G06F 7/483* | (2006.01) | |
| *G06F 7/544* | (2006.01) | |
| *G06F 7/556* | (2006.01) | |
| *G06N 20/00* | (2019.01) | |
| *G06N 3/063* | (2006.01) | |

(52) U.S. Cl.
CPC .......... *G06F 7/4833* (2013.01); *G06F 7/5443* (2013.01); *G06F 7/556* (2013.01); *G06N 3/063* (2013.01); *G06N 20/00* (2019.01); *G06F 2207/4824* (2013.01)

(58) Field of Classification Search
CPC ...... G06F 5/012; G06F 7/485; G06F 7/49915; G06F 2207/4824
See application file for complete search history.

(56) References Cited

U.S. PATENT DOCUMENTS

| | | | |
|---|---|---|---|
| 6,144,977 A | 11/2000 | Giangarra | |
| 2018/0315398 A1* | 11/2018 | Kaul | ........................ G06F 7/483 |
| 2018/0322607 A1* | 11/2018 | Mellempudi | ............. G06F 5/01 |

OTHER PUBLICATIONS

Y. Uguen and F. de Dinechin, "Design-space exploration for the Kulisch accumulator", Mar. 2017 (Year: 2017).*

(Continued)

*Primary Examiner* — Matthew D Sandifer
(74) *Attorney, Agent, or Firm* — Baker Botts L.L.P.

(57) ABSTRACT

In one embodiment, a method includes receiving a request for an operation to be performed; determining that the operation is associated with a machine-learning algorithm, and in response, route the operation to a computing circuit; performing, at the computing circuit, the operation, including: determining a linear domain product of a first log-domain number and a second log-domain number associated with the operation based on a summation of the first log-domain number and the second log-domain number and output a third log-domain number approximating the linear domain product of the first log-domain number and the second log-domain number; converting the third log-domain number to a first linear-domain number; summing the first linear-domain number and a second linear-domain number associated with the operation, and output a third linear-domain number as the summed result.

20 Claims, 4 Drawing Sheets

(56) References Cited

OTHER PUBLICATIONS

Kulisch, Ulrich, and Gerd Bohlender, "High speed associative accumulation of floating-point numbers and floating-point intervals", Reliab. Comput 23, pp. 141-153, 2016 (Year: 2016).*
Johnson, Rethinking Floating point for deep learning, 8 pages, Nov. 1, 2018.
Fowers, et al., A configurable cloud-scale dim processor for real-time AI, Microsoft, 14 pages, 2017.
Paszke, et al., Automatic differentiation in PyTorch, In NIPS, Long Beach, CA, 4 pages, 2017.
Taylor, Is dark silicon useful? Harnessing the four horsemen of the coming dark silicon apocalypse, DAC 2012, San Francisco, CA, 6 pages.
International Search Report and Written Opinion for International Application No. PCT/US2019/056905, dated Jan. 22, 2020.
International Search Report and Written Opinion for International Application No. PCT/US2019/056985, dated Jan. 23, 2020.
Kulisch et al., Mathematics and Speed for Interval Arithmetic A Complement to IEEE P1788; ACM Transactions on Mathematical Software, vol. 45, No. 1, pp. 1-22, Mar. 2019.
Lee et al., LogTOTEM: A Logarithmic Neural Processor and Its Implementation on An FPGA Fabric, Proceedings of International Joint Conference on Neural Networks, Orlando, Florida, USA, Aug. 12-17, 2007, pp. 1-2.
Lutz et al., High-Precision Anchored Accumulators for Reproducible Floating-Point Summation, 2017 IEEE 24th Symposium on Computer Arithmetic, pp. 98-105.
Zhang, et al., Efficient Fixed/Floating-Point Merged Mixed-Precision Multiply Accumulate Unit for Deep Learning Processors, 2018 IEEE, pp. 1-5.
Cai, et al., Deep Learning With Low Precision by Half-Wave Gaussian Quantization, 9 pages, 2017.
Coleman, et al., Arithmetic on the European Logarithmic Microprocessor, IEEE Transactions on Computers, vol. 49, No. 7, pp. 702-715, Jul. 2000.
Courbariaux, et al., Binarized Neural Networks: Training Deep Neural Networks with Weights and Activations Constrained to +1 or −1, arXiv:1602.02830v3, 11 pages, Mar. 17, 206.
Dettmers, 8-BIT Approximations for Parallelism in Deep Learning, arXiv:1511.04561v2 [cs.NE], 14 pages, Feb. 19, 2016.
Dicecco, FPGA-Based Training of Convolutional Neural Networks with a Reduced Precision Floating-Point Library, 4 pages, 2015.
Elias, Universal Codeword Sets and Representations of the Integers, IEEE Transactions on Information Theory, vol. IT-21, No. 2, 10 pages, Mar. 1975.
Galal, et al., Fpu Generator for Design Space Exploration, 10 pages, 2013.
Golomb, et al., Run-length encodings, Dept. of Elec. Engr. University of Southern California, pp. 399-401, 1966.
Google. TPU Tensorflow OPS, 28 pages. https://Cloud.Google.Com/Tpu/Docs/Tensorflow-Ops, 2019.
Gupta, et al., Agrawal, K. Gopalakrishnan, and P. Narayanan. Deep Learning with Limited Numerical Precision, Proceedings of the 32nd International Conference on Machine Learning, Lille, France, 10 pages, 2015.
Gustafson, et al., Beating Floating Point at Its Own Game: Posit Arithmetic, Supercomputing Frontiers and Innovations, 4(2):71-86, 2017.
Han, et al., Deep Compression: Compressing Deep Neural Networks with Pruning, Trained Quantization and Huffman Coding, arXiv preprint arXiv: 1510.00149, 14 pages, Feb. 15, 2015.
He, et al., Deep residual learning for Image Recognition, provided by the computer vision foundation, pp. 770-778, 2016.
Horowitz, et al., 1.1 Computing's Energy Problem (and what we can do about it). in solid-state circuits conference digest of technical papers (ISSCC), 2014 IEEE international, pp. 10-14.
Ioffe, et al., Batch normalization: Accelerating Deep Network Training by Reducing Internal Covariate Shift, In International Conference on Machine Learning, 9 pages, 2015.

Jacob, et al., Quantization and Training of Neural Networks for Efficient Integer-Arithmetic-only Inference, Provided by the Computer Vision Foundation, 10 pages, Jun. 2018.
Jaderberg, et al., Speeding Up Convolutional Neural Networks with Low Rank Expansions, arXiv:1405.3866v1, 12 pages May 15, 2014.
Jouppi, et al., In-datacenter Performance Analysis of a Tensor Processing Unit, In Computer Architecture (ISCA), pp. 1-12, 2017.
Kingsbury, et al., Digital Filtering Using Logarithmic Arithmetic, Electronics Letters, 7(8):56-58, Dec. 14, 1971.
Koster, et al., Flexpoint: An Adaptive Numerical Format for Efficient Training of Deep Neural Networks, In Advances in Neural Information Processing Systems, pp. 1-11, 2017.
Krizhevsky, Convolutional Deep Belief Networks on Cifar10, pp. 1-9, 2010.
Kulisch, Advanced Arithmetic for the Digital Computer: Design of Arithmetic Units, Version 2, pp. 1-73, Mar. 1999.
Lavin, et al., Fast Algorithms for Convolutional Neural Networks, In Proceedings of the IEEE Conference on Computer Vision and Pattern Recognition, pp. 4013-4021, 2016.
Lecun, et al., Optimal Brain Damage, AT&T Bell Laboratories, pp. 598-605, 1990.
Li, et al., Ternary Weight Networks, arXiv:1605.04711v2, pp. 1-5, Nov. 19, 2016.
Lin, et al., Fixed Point Quantization of Deep Convolutional Networks, In International Conference on Machine Learning, pp. pp. 1-10, 2016.
Lindstrom, et al., Universal Coding of the Reals: Alternatives to IEEE Floating Point, In Proceedings of the Conference for Next Generation Arithmetic, ACM, pp. 1-15, 2018.
Max, Quantizing for Minimum Distortion, IRE Transactions on Information Theory, 6(1):7-12, 1960.
Micikevicius, et al., Mixed Precision Training, arXiv preprint, arXiv:1710.03740, pp. 1-12, Feb. 15, 2018.
Migacz, 8-bit Inference with TensorRT, Nvidia GTC, 41 pages, May 8, 2017.
Miyashita, et al., Convolutional Neural Networks Using Logarithmic Data Representation, arXiv preprint arXiv:1603.01025c2, pp. 1-10, Mar. 17, 2016.
Morris, et al., Tapered Floating Point: A New Floating-Point Representation, IEEE Transactions on Computers, pp. 1578-1579, 1971.
Quinnell, et al., Floating-Point Fused Multiply-Add Architectures, IFEE, pp. 331-337, 2007.
Rastegari, et al., Xnornet-Net: ImageNet Classification Using Binary Convolutional Neural Networks, In European Conference on Computer Vision, pp. 1-17, Aug. 2, 2016.
Russakovsky, et al., Imagenet Large Scale Visual Recognition Challenge, International Journal of Computer Vision, 115:211-252, Apr. 11, 2015.
Swartzlander, et al., The Sign/Logarithm Number System, IEEE Transactions on Computers, 100(12):1238-1242, 1975.
Tulloch, et al., High Performance Ultra-Low-Precision Convolutions on Mobile Devices, arXiv:1712.02427v1 [CS. LG], 5 pages, Dec. 6, 2017.
Uguen, et al., Design-space Exploration for the Kulisch Accumulator, 7 pages, 2017.
Ullrich, et al., Soft Weight Sharing for Neural Network Compression, arXiv preprint arXiv:1702.04008v2, [Stat.ML], 16 pages, May 9, 2017.
VanHoucke, et al., Improving the Speed of Neural Networks on CPUs, 8 pages, 2011.
Widrow, et al., Quantization Noise: Roundoff Error in Digital Computation, Signal Processing, Control, and Communications. Cambridge University Press, New York, 781 pages, 2008.
Zuras, et al. IEEE Standard for Floating-Point Arithmetic, IEEE Std 754-2008, pp. 1-70, Aug. 29, 2008.
Johnson, Making Floating Point Math Highly Efficient for AI Hardware, AI Research, Data Infrastructure, pp. 1-9, Nov. 18, 2018.
Johnson, Rethinking floating point for deep learning, Facebook AI Research, pp. 1-8, 2018.

(56) References Cited

OTHER PUBLICATIONS

Johnson, Rethinking floating point for deep learning, Facebook AI Research, pp. 1-10, 2018.

* cited by examiner

OPTIMIZATION OF NEURAL NETWORKS USING HARDWARE CALCULATION EFFICIENCY AND ADJUSTMENT FACTORS

PRIORITY

This application claims the benefit, under 35 U.S.C. § 119(e), of U.S. Provisional Patent Application No. 62/747,583, filed Oct. 18, 2018, which is incorporated herein by reference.

TECHNICAL FIELD

This disclosure generally relates to the optimization of neural networks in computing systems using hardware calculation efficiency.

BACKGROUND

Machine learning explores the design of algorithms that learn from data. Machine learning algorithms adapt to inputs to build a model, and can then be used on new data to make predictions. Machine learning has ties to statistics, artificial intelligence and optimization, and is often employed in tasks where explicit rule-based algorithms are difficult to formulate. Artificial neural networks are computational tools capable of machine learning. In artificial neural networks, which will be referred to as neural networks hereinafter, interconnected computation units known as "neurons" are allowed to adapt to training data, and subsequently work together to produce predictions in a model that to some extent resembles processing in biological neural networks. Neural networks may comprise a set of layers, the first one being an input layer configured to receive an input. The input layer comprises neurons that are connected to neurons comprised in a second layer, which may be referred to as a hidden layer. Neurons of the hidden layer may be connected to a further hidden layer, or an output layer. In some neural networks, each neuron of a layer has a connection to each neuron in a following layer. Such neural networks are known as fully connected networks. The training data is used to let each connection to assume a weight that characterizes a strength of the connection. Some neural networks comprise both fully connected layers and layers that are not fully connected. Fully connected layers in a convolutional neural network may be referred to as densely connected layers. In some neural networks, signals propagate from the input layer to the output layer strictly in one way, meaning that no connections exist that propagate back toward the input layer. Such neural networks are known as feed forward neural networks. In case connections propagating back toward the input layer do exist, the neural network in question may be referred to as a recurrent neural network.

SUMMARY OF PARTICULAR EMBODIMENTS

The present disclosure discusses a computing device that can facilitate execution of computing operations, including exact log-linear multiply-add (ELMA) computing operations. At a high-level, performing ELMA computing operations by the computing device can use mathematical conversions to perform faster hardware calculations without using hardware multipliers. For example, consider performing the computing function c+ab by the computing device. Instead of performing multiplication operations by the computing device using binary number representations, the computing device can, in some examples, convert the binary number representations a and b to logarithmic number representations (expressed in binary). In some examples, the computing device can receive the logarithmic number representations a and b. The computing device can then perform an additional computation on the logarithmic number representations (e.g., the logarithmic number represents the exponent of some fixed base of the value in the linear domain) to generate a logarithmic number representation product, which can be computationally less expensive to implement in hardware of the computing device. The computing device can approximate the logarithmic number representation product to a linear domain representation product. The computing device can then perform an additional operation to add a linear number representation c to the linear domain representation product ab. The computing device can perform the additional computation by adding the linear number representation c to the linear representation product ab using an accumulator (e.g., a Kulisch accumulator).

Innovative aspects of the subject matter described in this specification may be embodied in a system including a processor configured to receive a request for an operation to be performed, determine that the operation is associated with a machine-learning algorithm, and in response, route the operation to a computing circuit configured to perform the operation, wherein the computing circuit comprises: an exponent adjustment computing module configured to apply an adjustment factor to a first linear-domain number to generate an adjusted first linear-domain number, and a summation computing module configured to determine, as a third linear-domain number, a summation of the first adjusted linear-domain number and a second linear-domain number, wherein the exponent adjustment computing module is further configured to apply an additional adjustment factor to the third linear-domain number to generate an adjusted third linear-domain number.

Other embodiments of these aspects include corresponding method, apparatus, and computer programs, configured to perform the actions of the methods, encoded on computer storage devices.

These and other embodiments may each optionally include one or more of the following features. For instance, the first linear-domain number is a floating-point number. The adjustment factor and/or the additional adjustment has a negative or a positive value. The summation computing module is a Kulisch accumulator. Converting the adjusted first linear-domain number to a fixed-point number prior to the summation. The summation computing module is a floating-point accumulator. The second linear-domain number is associated with the operation.

Innovative aspects of the subject matter described in this specification may be embodied in a method including receiving a request for an operation to be performed; determining that the operation is associated with a machine-learning algorithm, and in response, routing the operation to a computing circuit; and performing the computer-implemented operation at the computing circuit by: applying an adjustment factor to a first linear-domain number to generate an adjusted first linear-domain number; determining a summation, as a third linear-domain number, of the adjusted first linear-domain number and a second linear-domain number; applying an additional adjustment factor to the third linear-domain number to generate an adjusted third linear-domain number; and outputting the adjusted third linear-domain number.

Other embodiments of these aspects include corresponding systems, apparatus, and computer programs, configured to perform the actions of the methods, encoded on computer storage devices.

These and other embodiments may each optionally include one or more of the following features. For instance, the first linear-domain number is a floating-point number. The adjustment factor and/or the additional adjustment has a negative or a positive value. The summation of the first adjusted linear-domain number and the second linear-domain number is determined using a Kulisch accumulator. Converting the adjusted first linear-domain number to a fixed-point number prior to the summation. The summation of the first adjusted linear-domain number and the second linear-domain number is determined using a floating-point accumulator. The second linear-domain number is associated with the operation.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
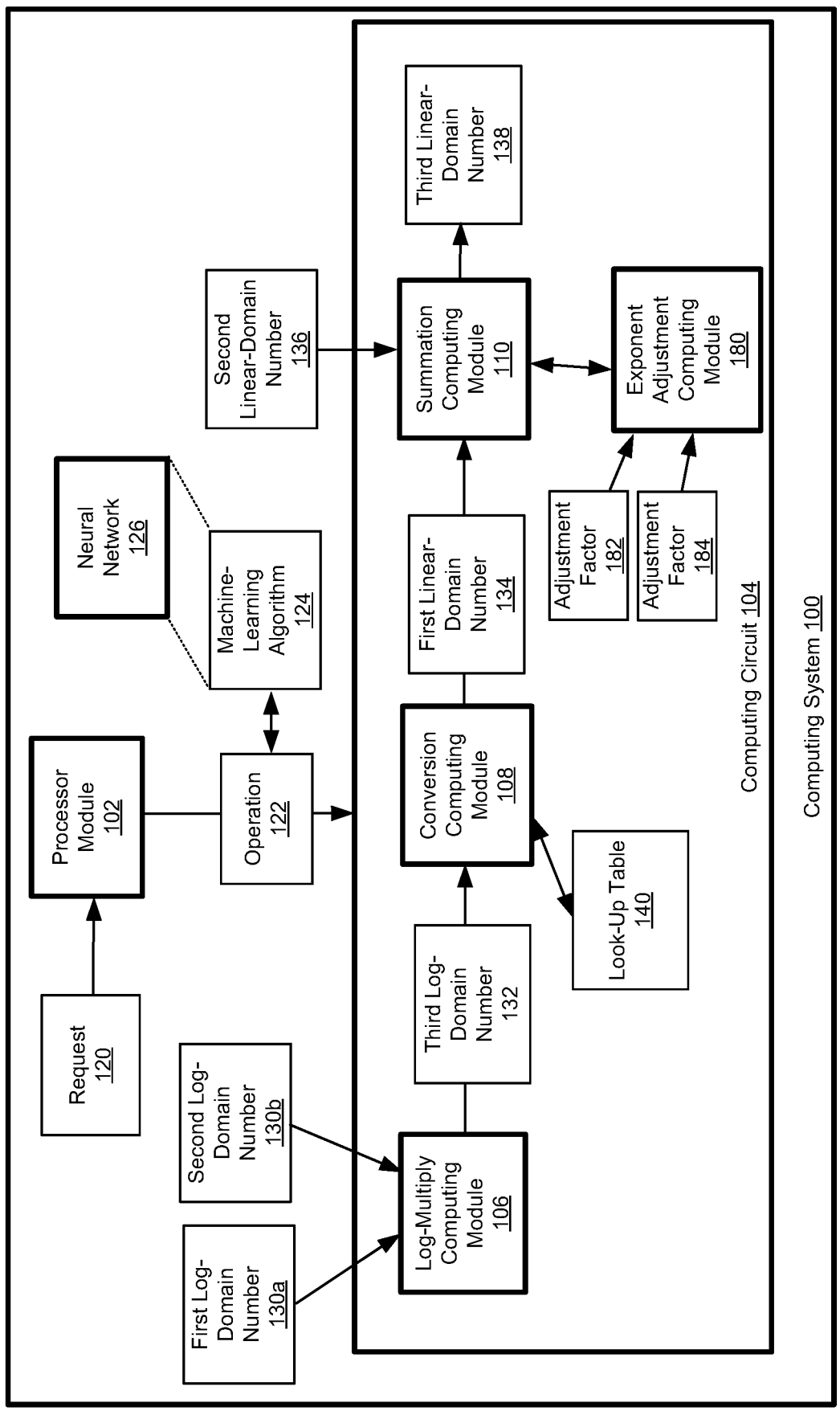
FIG. 1 illustrates an example computing environment for performing machine-learning operations for a neural network.

FIG. 1 illustrates a computing system 100 for performing machine-learning operations for a neural network. The computing system 100 can include a processor module 102 and a computing circuit 104. The computing circuit 104 can include a log-multiple computing module 106, a conversion computing module 108, a summation computing module 110, and an exponent adjustment computing module 180. In short, the computing system 100 can facilitate execution of computing operations, including exact log-linear multiply-add (ELMA) computing operations.

In some implementations, the processor module 102 can receive a request 120 for an operation 122 to be performed by the computing system 100. The processor module 102 can evaluate the operation 122 and determine that the operation 122 is associated with a machine-learning algorithm 124 of a neural network architecture 126.

The processor module 102, in response to determining that the operation 122 is associated with the machine-learning algorithm 124, routes the operation 122 to the computing circuit 104. The computing circuit 104 is configured to perform the operation 122. Specifically, the operation 122 can be associated with a first log-domain number 130a and a second log-domain number 130b (collectively referred to as log-domain numbers 130). In some examples, the log-domain numbers 130 can be represented herein as a binary radix-fixed point number prefixed with b and a radix point, if any, indicated by a period. For example, the representation b011 encodes the number 3, which in the log domain represents the linear domain value $2^3$ (or 8); and the representation b01.11 encodes the number 1.75, which in the log domain represents the linear domain value $2^{1.75}$ (or approximately 3.363585 . . . ). In some examples, the fixed-point representation of a log number can be in one of several encodings of a signed fixed-point binary number, including sign/magnitude, two's complement, or an unsigned value with implicit bias offset.

The log-domain numbers 130 can be unpacked log-domain numbers. An unpacked (X,Y) n-bit log-domain number 130 can include i) a n-bit two's complement signed fixed-point value V, with X non-fractional bits and Y fractional bits; ii) a sign flag S that indicates the sign of the log-domain number 130; iii) a zero flag Z that indicates whether or not the log-domain number 130 is zero; and iv) an infinity flag I that indicates whether or not the log-domain number 130 represents positive or negative infinity (or a not-a-number sentinel value if the number represents the result of an undefined operation like division by zero). Furthermore, the n-bit value V can be represented as bX.Y with the binary radix separator (between non-fractional and fraction portions) indicated. When the infinity flag I is marked as true, the unpacked number represents either positive or negative infinity, or a not-a-number sentinel value. When the infinity flag I is marked as false, the number represented is neither positive or negative infinity, nor a not-a-number sentinel value, at which point the zero flag Z is checked to determine the value (i.e., the infinity flag I, if marked as true, takes precedence over the zero flag Z). When the infinity flag I is marked as false and the zero flag Z is marked as true, the number represented has a zero value; and when the infinity flag I is marked as false and the zero flag Z is marked as false, the number represented is a normal value (not any of positive/negative infinity, a not-a-number sentinel value, or zero). When the sign flag S is marked as true, the number has a value $+2^V$ (e.g., 2 to the power of the signed fixed-point value V), and when the sign flag S is marked as false, the number has a value $-2^V$. For example, a 4-bit log-domain number {V: b01.10, S: b1, Z: b0, I: b0} represents the real number $-2^(1+\frac{1}{2})$, or the value $-(2 \times \sqrt{2})$. For example, the 4-bit log number {V: b11.10, S: b1, Z: b0, I: b0} represents the real number $-2^{(-1+\frac{1}{2})}$, or $-\sqrt{2}$.

In some implementations, the log-multiply computing module 106 receives the log-domain numbers 130 (e.g., data representing the log-domain numbers 130). The log-multiply computing module 106 is configured to determine a product (in the linear domain) of the log-domain numbers 130 based on their summation (i.e., the value V of the unpacked log number, which represents the exponent of the number in the linear domain) of the first log-domain number 130a and the second log-domain number 130b. The log-multiply computing module 106 can output a third log-domain number 132 representing the product (in the linear domain) of the log-domain numbers 130. Specifically, the summation of the log-domain numbers 130, representing their product in the linear domain (e.g., n-bit unpacked log-domain numbers) is the third log-domain number 132 (e.g., an unpacked n+1-bit log-domain number). The n+1 signed fixed-point value V of the third log-domain number 132 is the summation of the fixed-point values V of the log-domain numbers 130. This value V has X+1 non-fractional bits and Y fractional bits. The +1 indicates preservation of the additional dynamic range implied by the multiplication by the log-multiply computing module 106 of two large or two small numbers (e.g., the log-domain numbers 130). If the log-multiply computing module 106 determines that logical OR of the Z flags of the log-domain numbers 130 is true (i.e., either of the Z flags are zero), then the n+1 signed fixed-point value of the third log-domain number 132 is ignored as the product is zero. The sign flag S of the third log-domain number 132 is the exclusive-OR of the sign flags S of the log-domain numbers 130; the zero flag Z is the logical-OR of the zero flags Z of the log-domain numbers 130; and the infinity flag I is the logical-OR of the infinity flags I of the log-domain numbers 130.

For example, the first log-domain number 130a can be represented by a 4-bit log number as {V: b01.10, S: b1, Z: b0, I: b0} and the second-log domain number 130 can be represented by the 4-bit log number {V: b10.00, S: b0, Z: b0, I: M}. The multiplication of the log-domain numbers 130 (e.g., {V: b01.10, S: b1, Z: b0, I: b0}, and {V: b10.00, S: b0, Z: b0, I: b0}) is the third log-domain number 132 that is represented by a 5-bit log number as {V: b111.10, S: b1, Z: b0, I: M}. This 5-bit log number that is the third log-domain number 132 can represent the real number $2^{-0.5}$, or $-1/\sqrt{2}$.

In some implementations, the conversion computing module 108 can receive the third log-domain number 132 (e.g., data representing the third log domain number 132). The conversion computing module 108 is configured to convert the third log-domain number 132 to a first linear-domain number 134 as an approximation of the third log-domain number 132. The conversion computing module 108 can output the first linear domain number 134. Specifically, the third log-domain number 132 can be a n-bit unpacked log number {X.Y, S, Z, I} that the conversion computing module 108 coverts to the first linear-domain number 134 as a linear domain floating-point number (X, alpha), wherein X represents the integer portion of the base-2 linear domain exponent preserved from the third log-domain number 132 and alpha represents the number of floating-point significand fractional bits that approximates the fractional portion of the linear domain exponent represented by the log domain value (or, in other words, X is a floating point exponent, and alpha is the significand fraction bits). The parameter alpha can have any value greater than zero, and in some examples, set to the value of Y+1. This provides that every log fraction 0.Y has a unique linear fraction representation.

In some examples, the conversion computing module 108 converts the $2^Y$ possibly log fractions (e.g., b0.000 . . . 0 to b0.111 . . . 1) to a linear fraction using a function $p(f) = (2^f)-1$, wherein $f$ is the log fraction represented by Y log fractional bits. In some examples, the conversion computing module 108 is in communication with a look-up table (LUT) 140 (e.g., of table size ($2^Y \times$ alpha) bits). The conversion computing module 108 can access the LUT 140 to perform the function p(y) via explicitly listed mapping. In some examples, the conversion computing module 108 can perform piecewise linear approximation to perform the function p(y). In some examples, the conversion computing module 108 can execute a computer-implemented algorithm that generates bits of p(f) one or more at a time.

The first-linear domain number 134 can be a (A,B) n-bit linear floating point number that includes i) an unsigned number with an implicit bias or a signed two's complement number to represent the exponent, e.g., an A-bit signed integer E that represents an exponent; ii) a B-bit unsigned integer F that represents an unsigned fixed-point significand fraction (i.e., the unsigned integer is a fractional value in the range [0, 1−1/($2^B$)]; iii) where n is A+B (and the linear floating point value can be encoded in n bits); iv) the sign flag S indicates a sign of the floating point number; v) the zero flag Z indicates whether or not the floating point number is zero; and vi) the infinity flag I indicates whether or not the floating point number represents positive or negative infinity or not-a-number sentinel flag.

Thus, the floating-point A exponent is the X portion of the third log-domain number 132. The floating-point B fraction can be generated by the conversion computing module 108 using the function p(y), with the floating-point B fraction of size alpha bits. This represents the unsigned floating-point significand with a leading 1 (in normalized form) of the first-linear domain number 134. The values of the flags S, Z, and I of the first-linear domain number 134 are the same as the values for the third log-domain number 132.

For example, the third log-domain number 132 can be represented as {V: b111.10, S: b1, Z: b0, I: b0} (i.e., $-1/\sqrt{2}$, approximately −0.707 . . . ) with alpha equal to 3. The conversion computing module 108 can convert this example of third log-domain number 132 to the first linear-domain number 134 represented as {A: b111, B: b011, S: b1, Z: b0, I: b0}. This is the linear-domain approximation of the log-domain fraction b0.10 as ($2^{(b0.10)}$−1). The conversion computing module 108 can round this to 3 bits (via round to nearest even), producing b0.011, which is the significand b1.011. This example of the first-linear domain number 134 approximates the third log-domain number 132, e.g., $2^{-1} \times$ −(b1.011)=½×−1.375=−0.6875.

In some examples, the conversion computing module 108 is configured to identify the LUT 140 that stores correspondence between log-domain numbers and approximated linear-domain numbers. For example, the conversion computing module 108 can store a correspondence between the third log-domain number 132 and an approximation of the third-log-domain number 132 as the first-linear domain number 134. The conversion computing module 108 can then identify, based on the LUT 140, the first linear-domain number 134 that corresponds to the third log-domain number 132.

In some implementations, the summation computing module 110 can receive the first linear-domain number 134 from the conversion computing module 108. The summation computing module 110 can further receive a second linear-domain number 136 (e.g., data representing the second linear-domain number 136) that is associated with the operation 122. In some examples, the second linear-domain number 136 is a running summation of accumulation of linear-domain numbers by the summation computing module 110—e.g., a prior summation. The summation computing module 110 can be configured to sum the first linear-domain number 134 (e.g., a summand) and the second linear-domain number 136 (e.g., an accumulator). The summation computing module 110 can output a third linear-domain number 138 as the summed result of the first linear-domain number 134 and the second linear-domain number 136.

In some examples, the summation computing module 110 can be a linear accumulator that can store the sum of many linear-domain numbers (e.g., the summation of the product of many log-domain numbers). In some examples, the summation computing module 110 can be a fixed-point accumulator, e.g., a Kulisch accumulator for exact log-linear multiply-add (ELMA) accumulation, or a linear floating-point accumulator for floating point log-linear multiply-add (FLMA) accumulation.

Specifically, for ELMA accumulation, the third linear-domain number 138 (e.g., Kulisch accumulation) can include i) a signed two's complement fixed-point value V with M non-fractional bits and N fractional bits (M+N total bits) represented as bM.N; and ii) an infinity flag I that indicates a positive or negative infinity of the Kulisch accumulator. The initial value of the Kulisch accumulator is zero for bM.N and the infinity flag I.

For example, for a value of M of 6 bits and a value of N of 5 bits, the initial value of the Kulisch accumulator is {V: b000000.00000, I: b0}. The first linear-domain number 134 can have a value of {A: bill, B: b011, S: b1, Z: b0, I: b0}. The summation computing module 110 can form a fixed-point expansion of the first linear-domain floating point number 134 to a signed fixed-point number of M.N bits, the same size of the Kulisch accumulator.

The summation computing module 110 represents the significand as a signed fixed-point number (adding an additional bit). Thus, the summation computing module 110 converts b1.011 to b01.011, and then, as this value is negative (Z: b1), the summation computing module 110 takes the two's complement of b01.011, with the result being b10.101.

The summation computing module 110 extends this value with zeros on the least significant bit to form a 6-bit.5-bit number, resulting in b101010.00000 (e.g. the number −22). This is a fixed-point representation of the original floating-point significand with an exponent value of +4. For example, the summation computing module 110 can adjust the significand by the factor $2^{\wedge}(M-2)$. Continuing the example above, the summation computing module 110 determines the exponent has the value +4 when M−2 is added to the original exponent, or (6−2)+=4.

The summation computing module 110 shifts the summand fixed-point number (e.g., the first linear-domain number 134) to adjust the fixed-point representation to match the original exponent indicated above, e.g. −1, to the right towards the least significant bit (e.g., (+4−(−1))=5 places). As the fixed-point value is signed, the summation computing module 110 shifts the summand fixed-point number (e.g., the first linear-domain number 134) via sign-extension (e.g., copy the value of the most significant bit) resulting in the value of b111111.01010 (which is the value of −0.6875). If the summation computing module 110 determines that the zero flag Z of the floating-point summand (e.g., the first linear domain number 134) is marked as true, the summation computing module 110 ignores this value, and the expanded fixed-point representation is zero—continuing the example, the expanded fixed-point representation is b000000.00000.

In some examples, the summation computing module 110 stores a previous sum (e.g., the third linear-domain number 138) and after each accumulation, the previous sum is summed with an additional linear-domain number (e.g., the accumulator).

In some examples, the infinity flag I of the third linear-domain number 138 is the logical OR of the infinity flag I of the previous accumulation value (if any) and the infinity flag I of the first-linear domain number 134.

Additionally, for FLMA accumulation, the summation computing module 110 can include a floating-point adder, with the linear-domain sum of approximated log values maintained in a floating-point representation. The floating-point accumulator of the summation computing module 110 can include exponent bits E and fractional significant bits F.

In some examples, for subsequent accumulations, the third linear-domain number 138 can become the second linear-domain number 136 such that the conversion computing module 108 can be configured to sum the first linear-domain number 134 and the second linear-domain number 136, as described above.

Figure 2:
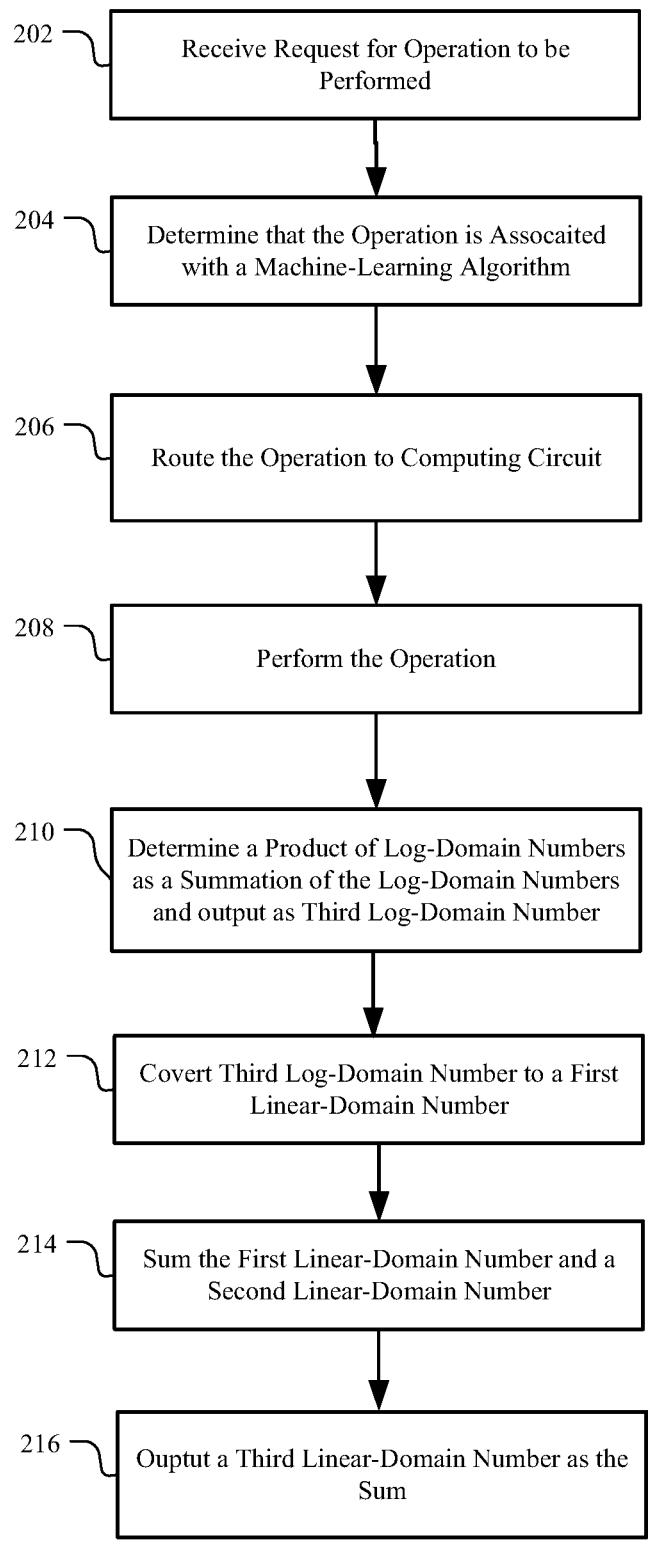
FIG. 2 illustrates an example flowchart for performing machine-learning operations for a neural network.

FIG. 2 illustrates an example method 200 for performing machine-learning operations for a neural network. The method may begin at step 202, where the processor module 102 receives the request 120 for the operation 122 to be performed. At step 204, the processor module 102 determines that the operation 122 is associated with the machine-learning algorithm 124. At step 206, in response to determining that the operation 122 is associated with the machine-learning algorithm 124, the processor module 102 routes the operation 122 to the computing circuit 104. At step 208, the computing circuit 104 performs the operation 122. At step 210, the log-multiply computing module 106 determines the (linear domain) product of the first log-domain number 130a and the second log-domain number 130b associated with the operation 122 as a summation of the of the first log-domain number 130a and the second log-domain number 130b, which is output as the third log-domain number 132. At step 212, the conversion computing module 108 converts the third log-domain number 132 to the first linear-domain number 134 as an approximation of the third log-domain number 132. At step 214, the summation computing module 110 sums the first linear-domain number 134 and the second linear-domain number 136 associated with the operation 122. At step 216, the summation computing module 110 outputs the third linear-domain number 138 as the summed result.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for performing machine-learning operations for a neural network including the particular steps of the method of FIG. 2, this disclosure contemplates any suitable method for performing machine-learning operations for a neural network including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Referring back to FIG. 1, the exponent adjustment computing module 180 can be used to apply an adjustment factor to the first linear-domain number 134 and/or the third linear-domain number 138 to ensure the same can be encoded in a limited number of bits in memory. Specifically, the exponent adjustment computing module 180 can apply an adjustment factor to the numbers to scale the numbers into "workable units" the computing system 100 is able to appropriately process. The exponent adjustment computing module 180 can apply the adjustment factor to the first linear-domain number 134, as well as the third linear domain-number 138 (e.g., depending on the processing needs for further processing of the output number). In some examples, the exponent adjustment computing module 180 can apply an exponent bias factor as the adjustment factor to adjust the input exponent by summation by m, or the output exponent by n (checking for underflow or overflow as needed). The accumulator can be a Kulisch accumulator, or a floating-point accumulator.

In some implementations, the exponent adjustment module 180 can receive the first linear-domain number 134 (e.g., data representing the first linear-domain number 134). The exponent adjustment module 180 is configured to apply an adjustment factor 182 to an exponent of the first linear-domain number 134 to generate an adjusted first linear-domain number. In some examples, the first linear-domain number 134 is a floating-point number.

In some examples, the exponent adjustment module 180 can apply the adjustment factor 182 to the first-linear domain number 134 when an adjustment factor has been applied previously, e.g., an output of a linear-algebra operation performed by the computing system 100 such as matrix multiplication or convolution. In some cases, a distribution of the exponent of the first linear-domain number 134 is within the threshold (e.g., bounds) and provided as a configuration parameter to the exponent adjustment module 180, and in response, reverse any previous application of adjustment factors by applying the adjustment factor 182.

In some cases, the exponent adjustment module 180 applies the adjustment factor 182 to ensure that n-bit encoding of the first linear-domain number 134 is preserved and not subject to saturation (as in traditional floating-point encoding) or loss of precision (as in posit-type encoding).

In some implementations, the exponent adjustment module 180 can receive the third linear-domain number 138 (e.g., data representing the third linear-domain number 138). The exponent adjustment module 180 is configured to apply the adjustment factor 184 to an exponent of the third linear-domain number 138 to generate an adjusted third linear-domain number. In some examples, the third linear-domain number 138 is a floating-point number.

In some examples, the exponent adjustment module 180 can apply the adjustment factor 184 to the third-linear domain number 138 when an adjustment factor has been applied previously, e.g., an output of a linear-algebra operation performed by the computing system 100 such as matrix multiplication or convolution. In some cases, a distribution of the exponent of the third linear-domain number 138 is within the threshold (e.g., bounds) and provided as a configuration parameter to the exponent adjustment module 180, and in response, reverse any previous application of adjustment factors by applying the adjustment factor 184.

In some cases, the exponent adjustment module 180 applies the adjustment factor 184 to ensure that n-bit encoding of the third linear-domain number 138 is preserved and not subject to saturation (as in traditional floating-point encoding) or loss of precision (as in posit-type encoding).

In some examples, the exponent adjustment module 180 is further configured to apply the adjustment factor 184 to an exponent of the third linear-domain number 138 to control a center of a dynamic range used by the third linear-domain number 138. The adjustment factor 184 can be a fixed value that is maintained across multiple summations. The exponent adjustment module 180 can use the adjustment factor 184 when the third-linear domain number 138 is to be re-encoded into a n-bit logarithmic or linear-floating point representation when the third-linear domain number 138 is out of range of a desired n-bit encoding, or in the case of posit-type codes, out of range of maximum precision. In some examples, the adjustment factors 182, 184 can have substantially the same absolute value. In some examples, the adjustment factor 182 is negative and the adjustment factor 184 is positive (e.g., the adjustment factor 184 is a negation (multiplication by −1) of the adjustment factor 182). In some examples, the value of the adjustment factor 182 differs from the adjustment factor 184 (e.g., have no direct relationship).

For example, the third linear-domain number 138 can have a floating-point value of {A: 8, B: b1.00001111, S:1, Z:0, I:0}, which represents the value of $-2^8 \ast (b1.00001111) = -2^8 \times (1.05859375) = -271.0$. The exponent adjustment module 180 can apply the adjustment factor 184 to the third linear-domain number 138 of −5, which is summed with the exponent A to generate the linear floating-point number of {A: 3, b1.00001111, S:1, Z:0, I:0}, which represents the value of −8.4687. In some examples, the exponent adjustment module 180 can round this value and encoded such in a desired n-bit linear floating-point or logarithmic fixed-point representation.

In some examples, the exponent adjustment module 180 can apply the adjustment factor 182 and the adjustment factor 184 independently for each operation 122. By doing such, the exponent adjustment module 306 may be able to re-center the distribution of values to approximately 1.0 for calculations used in the neural network 126. The computing circuit 104 can determine the adjustment factors for each layer of the neural network 126 to facilitate maximization of processing for in-memory representations of neural network activations between layers.

Figure 3:
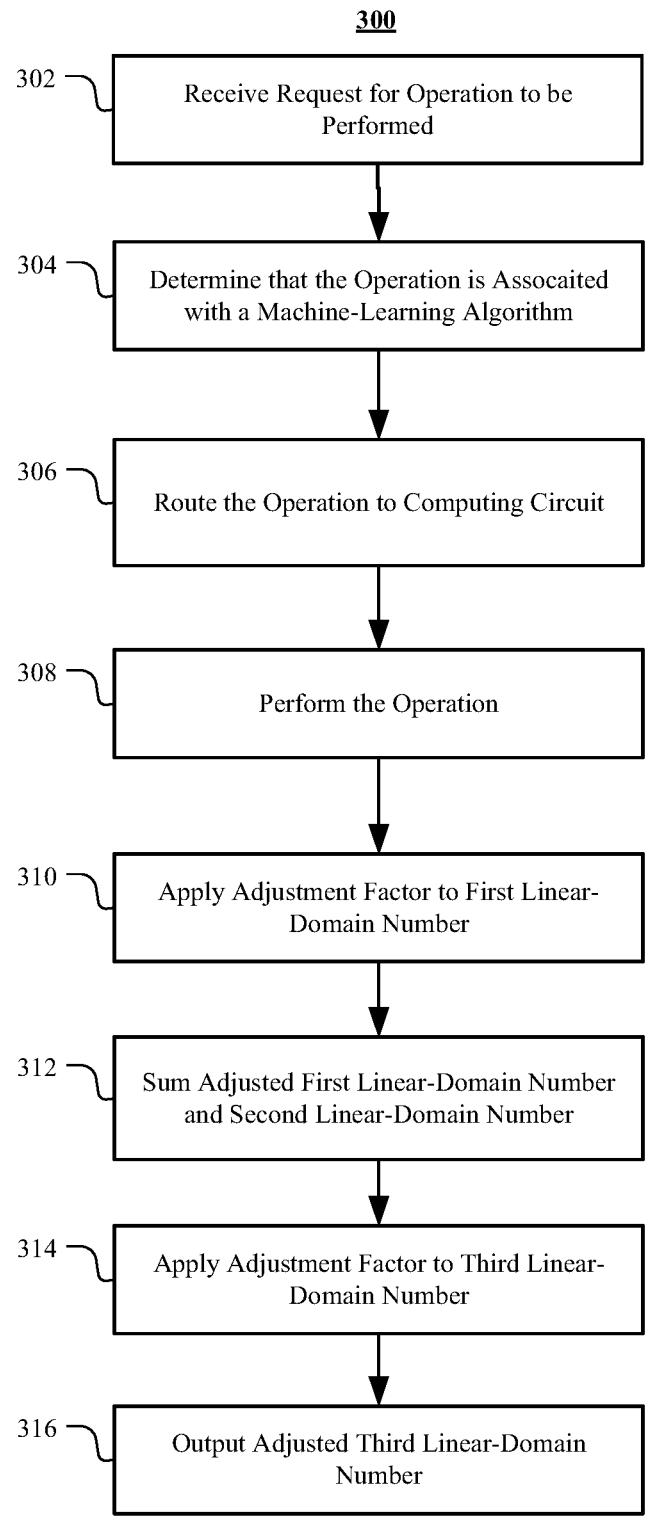
FIG. 3 illustrates an example flowchart for adjusting values within machine-learning operations for a neural network.

FIG. 3 illustrates an example method 300 for adjusting values within machine-learning operations for a neural network. The method may begin at step 302, where the processor module 102 receives the request 120 for the operation 122 to be performed. At step 304, the processor module 102 determines that the operation 122 is associated with the machine-learning algorithm 124. At step 306, the processor module 102, in response to determining that the operation 122 is associated with the machine-learning algorithm 124, routes the operation 122 to the computing circuit 104. At step 308, the computing circuit 104 performs the operation 122. At step 310, the exponent adjustment module 180 applies the adjustment factor 182 to the first linear-domain number 134 to generate an adjusted first-linear domain number. At step 312, the summation computing module 110 sums the adjusted first linear-domain number and the second linear-domain number 136 associated with the operation as the third linear domain number 138. At step 314, the exponent adjustment module 180 applies the adjustment factor 184 to the third linear-domain number 138. At step 316, the exponent adjustment module 306 outputs the adjusted third linear-domain number.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for adjusting values within machine-learning operations for a neural network including the particular steps of the method of FIG. 3, this disclosure contemplates any suitable method for adjusting values within machine-learning operations for a neural network including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
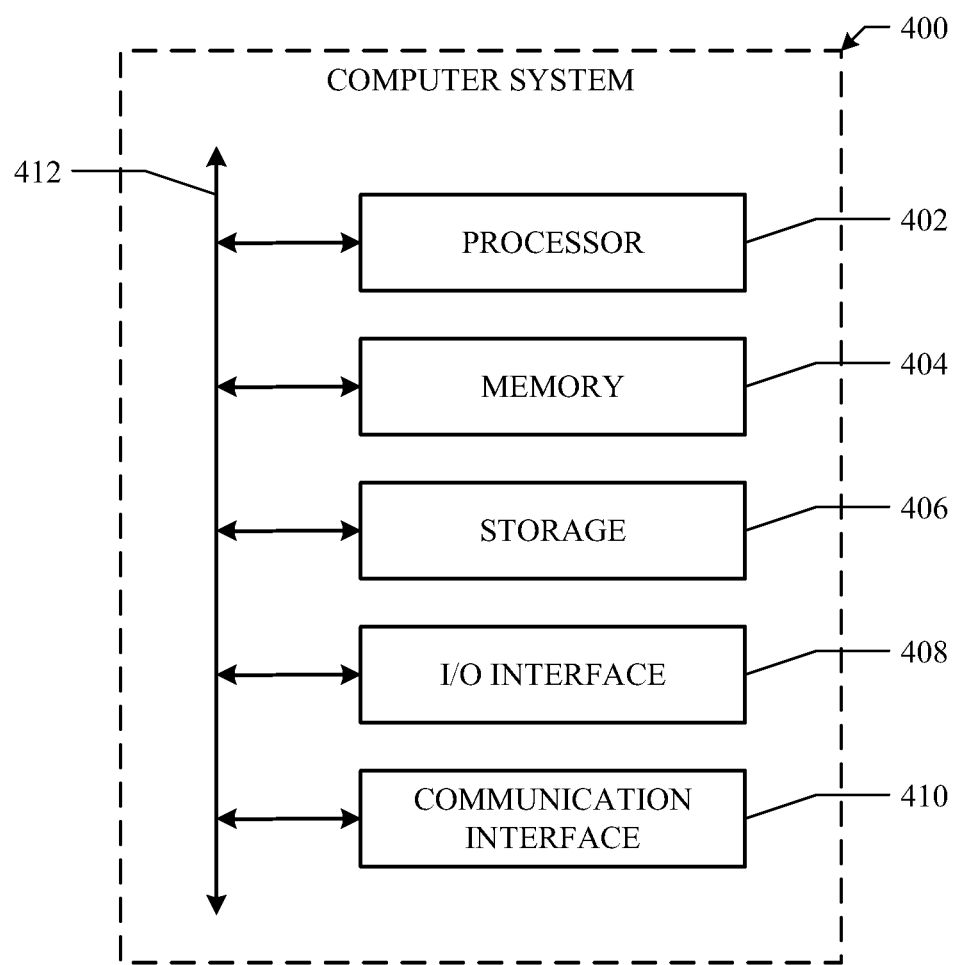
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate.

Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
a processor configured to receive a request for an operation to be performed, determine that the operation is associated with a machine-learning algorithm, and in response, route the operation to a computing circuit configured to perform the operation, wherein the computing circuit comprises:
a conversion computing module configured to receive a log-domain number, and convert the log-domain number to a first linear-domain number by identifying a correspondence between the log-domain number and the first linear-domain number as indicated by a look-up table (LUT);
an exponent adjustment computing module configured to determine a first adjustment factor to apply to a first linear-domain number to generate an adjusted first linear-domain number such that the adjusted first linear-domain number is able to be encoded in a number of bits of memory, the memory storing linear-domain numbers, and
a summation computing module configured to determine, as a third linear-domain number, a summation of the adjusted first linear-domain number and a second linear-domain number,
wherein the exponent adjustment computing module is further configured to determine a third adjustment factor to apply to the third linear-domain number to generate an adjusted third linear-domain number such that the adjusted third linear-domain number is able to be encoded in the number of bits of memory.

2. The system of claim 1, wherein the first linear-domain number is a floating-point number.

3. The system of claim 1, wherein the first adjustment factor and/or the third adjustment factor has a negative or a positive value.

4. The system of claim 1, wherein the summation computing module is a Kulisch accumulator.

5. The system of claim 2, wherein the conversion computing module is further configured to convert the adjusted first linear-domain number to a fixed-point number prior to the summation.

6. The system of claim 1, wherein the summation computing module is a floating-point accumulator.

7. The system of claim 1, wherein the second linear-domain number is associated with the operation.

8. A computer-implemented method, comprising:
receiving a request for an operation to be performed;
determining that the operation is associated with a machine-learning algorithm, and in response, routing the operation to a computing circuit; and
performing the operation at the computing circuit by:
receiving a log-domain number, and converting the log-domain number to a first linear-domain number by identifying a correspondence between the log-domain number and the first linear-domain number as indicated by a look-up table (LUT);
determining a first adjustment factor to apply to a first linear-domain number to generate an adjusted first linear-domain number such that the adjusted first linear-domain number is able to be encoded in a number of bits of memory, the memory storing linear-domain numbers;
determining, as a third linear-domain number, a summation of the adjusted first linear-domain number and a second linear-domain number;
determining a third adjustment factor to apply to the third linear-domain number to generate an adjusted third linear-domain number such that the adjusted third linear-domain number is able to be encoded in the number of bits of memory; and
outputting the adjusted third linear-domain number.

9. The computer-implemented method of claim 8, wherein the first linear-domain number is a floating-point number.

10. The computer-implemented method of claim 8, wherein the first adjustment factor and/or the third adjustment factor has a negative or a positive value.

11. The computer-implemented method of claim 8, wherein the summation of the adjusted first linear-domain number and the second linear-domain number is determined using a Kulisch accumulator.

12. The computer-implemented method of claim 9, further comprising converting the adjusted first linear-domain number to a fixed-point number prior to the summation.

13. The computer-implemented method of claim 8, wherein the second linear-domain number is associated with the operation.

14. The computer-implemented method of claim 8, wherein the summation of the adjusted first linear-domain number and the second linear-domain number is determined using a floating-point accumulator.

15. A non-transitory computer-readable medium storing software comprising instructions executable by one or more computers which, upon such execution, cause the one or more computers to perform operations comprising:
receive a log-domain number, and converting the log-domain number to a first linear-domain number by identifying a correspondence between the log-domain number and the first linear-domain number as indicated by a look-up table (LUT);
determine a first adjustment factor to apply to a first linear-domain number to generate an adjusted first linear-domain number such that the adjusted first linear-domain number is able to be encoded in a number of bits of memory, the memory storing linear-domain numbers;
determine, as a third linear-domain number, a summation of the adjusted first linear-domain number and a second linear-domain number;
determine a third adjustment factor to apply to the third linear-domain number to generate an adjusted third linear-domain number such that the adjusted third linear-domain number is able to be encoded in the number of bits of memory; and
output the adjusted third linear-domain number.

16. The computer-readable medium of claim 15, wherein the first linear-domain number is a floating-point number.

17. The computer-readable medium of claim 15, wherein the first adjustment factor and/or the third adjustment factor has a negative or a positive value.

18. The computer-readable medium of claim 15, wherein the summation of the adjusted first linear-domain number and the second linear-domain number is determined using a Kulisch accumulator.

19. The computer-readable medium of claim 16, the operations further comprising convert the adjusted first linear-domain number to a fixed-point number prior to the summation.

20. The computer-readable medium of claim 15, wherein the summation of the adjusted first linear-domain number and the second linear-domain number is determined using a floating-point accumulator.

\* \* \* \* \*